US007698722B1

(12) United States Patent
Chatelier et al.

(10) Patent No.: US 7,698,722 B1
(45) Date of Patent: Apr. 13, 2010

(54) METHOD AND RECEIVER FOR MANAGING THE CONSISTENCY OF SERVICE LISTS IN DIGITAL TELEVISION

(75) Inventors: Laurent Chatelier, Geveze (FR); Luc Gentil, Thorigné Fouillard (FR); Eric Deniau, La Baussaine (FR)

(73) Assignee: Thomson Licensing, Boulogne-Billancourt (FR)

( * ) Notice: Subject to any disclaimer, the term of this patent is extended or adjusted under 35 U.S.C. 154(b) by 1348 days.

(21) Appl. No.: 10/019,193

(22) PCT Filed: Jun. 21, 2000

(86) PCT No.: PCT/EP00/05732

§ 371 (c)(1),
(2), (4) Date: Dec. 21, 2001

(87) PCT Pub. No.: WO00/79787

PCT Pub. Date: Dec. 28, 2000

(30) Foreign Application Priority Data

Jun. 21, 1999 (EP) .................................. 99401564

(51) Int. Cl.
*H04N 5/445* (2006.01)

(52) U.S. Cl. .............................. 725/50; 725/44; 725/46; 725/68; 725/132; 348/465

(58) Field of Classification Search ............. 725/37–61, 725/68, 85, 100, 132, 134, 139, 140, 142, 725/150, 151; 348/465, 554, 725, 731
See application file for complete search history.

(56) References Cited

U.S. PATENT DOCUMENTS

| 5,483,278 | A | | 1/1996 | Strubbe | 348/7 |
| 5,652,613 | A | * | 7/1997 | Lazarus et al. | 725/50 |
| 5,758,257 | A | * | 5/1998 | Herz et al. | 725/116 |
| 5,872,588 | A | * | 2/1999 | Aras et al. | 725/14 |
| 5,917,481 | A | * | 6/1999 | Rzeszewski et al. | 715/721 |
| 5,977,964 | A | * | 11/1999 | Williams et al. | 715/721 |

(Continued)

FOREIGN PATENT DOCUMENTS

EP 823 798 A1 2/1998

(Continued)

OTHER PUBLICATIONS

Search Report.

*Primary Examiner*—Annan Q Shang
(74) *Attorney, Agent, or Firm*—Robert D. Shedd; Harvey D. Fried; Joel M. Fogelson

(57) ABSTRACT

The present invention consists of a method for managing the consistency of service lists broadcasted by a digital television network, the service lists containing parameters corresponding to each broadcasted services and being received in a television receiver and stored in a memory, wherein, it comprises the step of the method wherein it comprises the step of triggering a consistency check between said at least one customized list of services and the downloaded update of a list of services available to the receiver, the moment for triggering being chosen by an application in said receiver, so as not to disrupt receiver use by said check.

The invention can be used in the field of digital television.

The invention concerns also the receiver using the method.

10 Claims, 2 Drawing Sheets

U.S. PATENT DOCUMENTS

| | | | | |
|---|---|---|---|---|
| 6,055,570 | A * | 4/2000 | Nielsen | 709/224 |
| 6,138,908 | A * | 10/2000 | Moon et al. | 235/380 |
| 6,163,316 | A * | 12/2000 | Killian | 715/721 |
| 6,177,931 | B1 * | 1/2001 | Alexander et al. | 725/52 |
| 6,298,482 | B1 * | 10/2001 | Seidman et al. | 725/101 |
| 6,337,719 | B1 * | 1/2002 | Cuccia | 348/731 |
| 6,357,046 | B1 * | 3/2002 | Thompson et al. | 725/139 |
| 6,374,404 | B1 * | 4/2002 | Brotz et al. | 725/46 |
| 6,400,421 | B1 * | 6/2002 | Sakakibara | 348/732 |
| 6,460,018 | B1 * | 10/2002 | Kasai et al. | 705/8 |
| 6,493,037 | B1 * | 12/2002 | Raiyat | 348/564 |
| 6,681,247 | B1 * | 1/2004 | Payton | 709/217 |
| 6,691,311 | B1 * | 2/2004 | Yata et al. | 725/68 |

FOREIGN PATENT DOCUMENTS

| | | |
|---|---|---|
| JP | 11134345 | 5/1999 |
| KR | 10-0222700 | 7/1999 |
| WO | 9607270 A1 | 3/1996 |

* cited by examiner

METHOD AND RECEIVER FOR MANAGING THE CONSISTENCY OF SERVICE LISTS IN DIGITAL TELEVISION

This application claims the benefit under 35 U.S.C. §365 of International Application PCT/EP00/05732, filed Jun. 21, 2000, which claims the benefit of European Patent Application No. 99401564.2, filed Jun. 21, 1999.

FIELD OF THE INVENTION

This invention concerns the digital television field, and more specifically the processing of service infornation (SI) data. The implementation detailed below is mainly based on the DSS system (Direct Satellite System), even if the principle can easily be extended to other similar standards, such as the European DVB (ETSI document ref. EN300468) or ATSC (ATSC ref. A/56).

BACKGROUND

New generation digital television systems include the possibility to broadcast applications in the bitstreams. These applications can then be downloaded by the receivers (set-top boxes), and be executed on their CPUs in order to present to the user dedicated features related to the television services he or she can access. These applications are built on top of Application Programming Interfaces (API) that offer the basic features available on the set-top box with which the high-level features to be proposed to the user can be built. Existing commercial software packages provide such an operating system for digital decoders.

One major feature of a digital receiver device is the management of the service lists displayed to the user. One of the first data the integrated receiver/decoder (IRD) must acquire before being operational is an image of the broadcast service list, described in the guide data contained in the bitstream. Then, the IRD software offers customized features, among which the possibility to create customized service lists from this broadcast list and store them in non-volatile memory. One of these customized lists can then be selected and presented to the user. It is from this list, for example, a list of preferred services, that the user chooses the service he wants to watch.

The invention applies to IRDs operating on any type of broadcast network, either satellite, cable or terrestrial. It deals with an efficient way to manage the consistency between the different service lists derived from the broadcast one by at least one user and stored in non-volatile memory. This has to be done in order to avoid such problems as a user or an application trying to connect to a service contained in one of its custom lists that has disappeared or been modified in the broadcast streams.

Most up-to-date digital television systems offers the possibility to install IRDs (i.e. build the list of services accessible to the IRD—IRD standing for Integrated Receiver Decoder) by means of service information data. In the DSS system, this data is contained in what is referred to as the Master Program Guide (MPG) that describes the services contained in the physical transport channels (PTC), grouping them by segments. The advantage of using this as a reference is first to acquire all data necessary to build an up-to-date broadcast service list from one single frequency (sometimes called the "barker channel") and then to be able to update this information without requiring any action from the user.

A classical feature contained in IRDs is the possibility to build one or several customized service lists according to personal preferences, and to store them in non-volatile memory such that the user does not have to rebuild it every time the IRD is switched off.

When an update occurs in the broadcast MPG, and if the IRD is listening to new versions of this program guide, the list of broadcast services (which is resident in the decoder's memory and regularly updated) managed by the IRD software will be updated accordingly. If services have been deleted or modified (e.g. moved from one PTC to another), the customized service lists that have been derived from it should also be updated accordingly in order to make them consistent with it. Not performing this will result for the viewer in connections to non-existing services and hence unexplained black-screens.

The following methods could be used to verify the coherence of the service lists:
  notifying the viewer of a change and asking him to check or rebuild all customised lists; this has one major drawback to request an explicit action from the user;
  checking in the customised service lists whether their content is still compatible with the broadcast one as soon as this one changes; this other technique can be time consuming depending on the number of services and of service lists.

Both have as a major drawback the time consumption, in the first case from the user, and in the second from the CPU.

The latter case is a problem as it can happen at any time and monopolize CPU processing power. Indeed, if around 600 services are available, a comparison with a number of customized list of a few hundred services each may take a certain amount of time.

SUMMARY OF THE INVENTION

The object of the invention is a method for managing the consistency of service lists broadcasted by a digital television network, the service lists containing parameters corresponding to each broadcasted services and being received in a television receiver and stored in a memory, characterized in that, it comprises the step of:
  triggering means for updating said stored list,
  consistency checking between at least one stored list of services and a received list of service,
  updating the stored list in the memory of receiver with at least one parameter of the second list.

In this way, the consistency check is triggered at a determined time so that that does not disrupt the receiver use.

Another object of the invention is a receiver in a digital television system containing a central unit, reception means to receiving broadcasted services and services lists, memory containing a program, a buffer memory storing customized at least one service list characterized in that the memory contains a module for checking the consistency of service and a memory for storing an application adapted to trigger the said module, and that the receiver comprises means for checking the coherence between a list received by the reception means and one of the said customized lists.

BRIEF DESCRIPTION OF THE DRAWINGS

Other characteristics and advantages of the invention will appear through the description of a non-restrictive embodiment of the invention, described in reference to the enclosed drawings.

DETAILED DESCRIPTION

Figure 1:
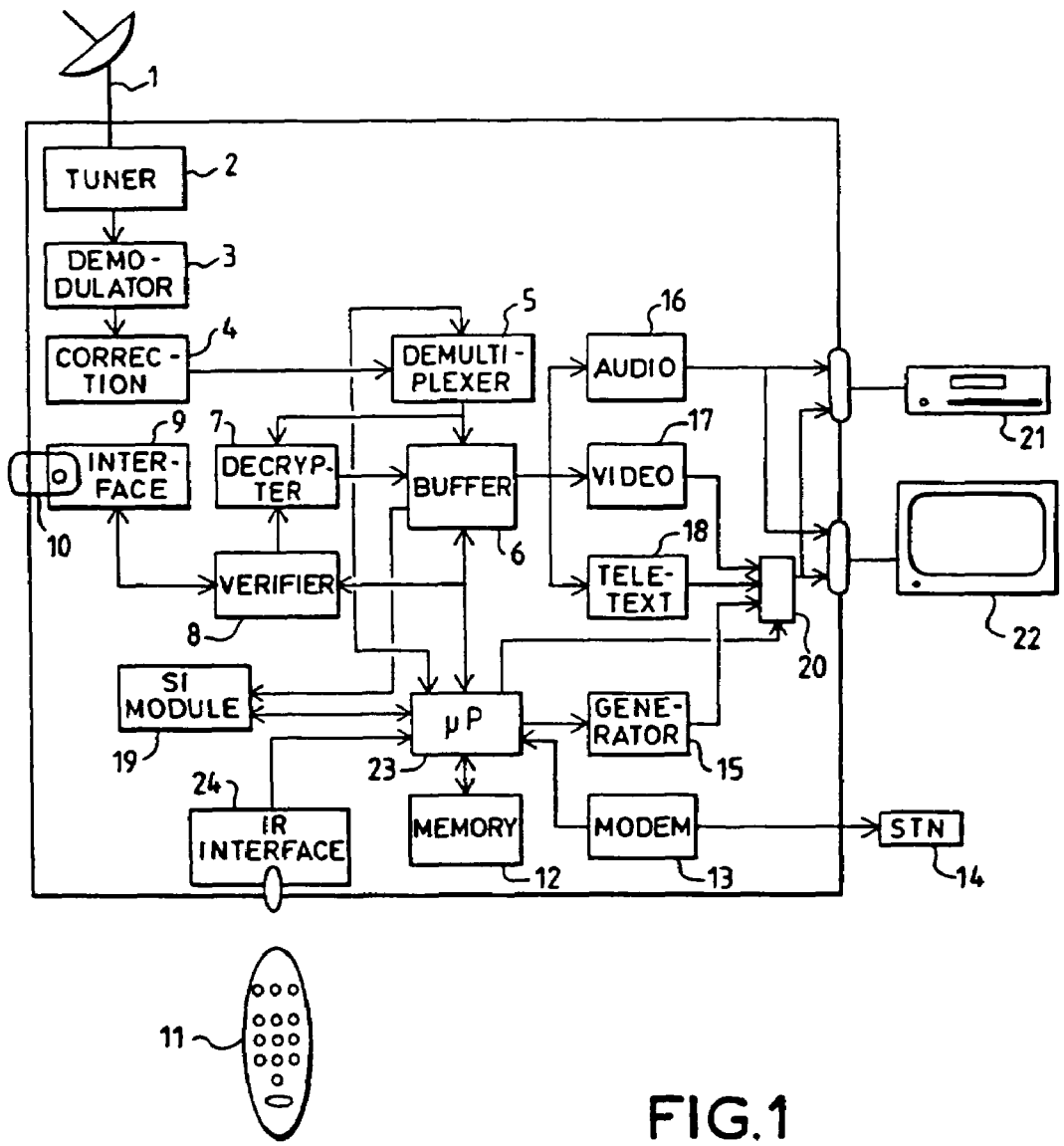
FIG. 1 is a block diagram of a television receiver implementing the present embodiment.

The decoder of FIG. 1 comprises a tuner 2 linked to a signal source 1. In the present embodiment, the signal source is a satellite dish and associated frequency converter. The signal provided by the tuner is demodulated by a demodulator 3. The demodulated data are corrected by a corrector circuit 4 and transmitted to a demultiplexer 5. The demultiplexer 5 includes a certain number of filters programmed by a microprocessor 23 in view of the requirements of the operating system of the decoder and the various applications supported by the decoder, for providing requested data packets. For the clarity of the diagram, only some connections of the microprocessor 23 are illustrated. Applications of the decoder include audio decoder 16, video decoder 17, teletext decoder/generator 18, a conditional access sub-system (including a decrypting circuit 7, a verifier circuit 8 for communication with a smart card 10 through smart card interface 9), and a service information module 19.

The data packets filtered by the demultiplexer are stored in predefined areas in a buffer memory 6 for access by the operating system and the applications. If necessary, the received information is first decrypted by a decrypting circuit 7 depending on the user's entitlements stored in the smart card 10, before being stored in the buffer memory 6. Certain data packet types contain a description of the services broadcast in the network, and paths to the different components of each service. A service may comprise audio, video and other data components.

The decoder also includes an infrared receiver 24 for communication with a remote control 24, the said receiver 24 being linked to the microprocessor 23. The latter is connected to a memory 12 that includes the operating system as well as code and data for some of the applications. Code or data may be resident or downloaded. A modem 13 linked to the switched telephone network 14 is also controlled by the microprocessor.

A character generator 15 allows the generation of control menus relating to the parameters of the decoder or to a particular application. The video signal generated by this character generator is multiplexed with one of the video signals coming from the video decoder 17 or from the Teletext decoder 18 towards a first connector linked to a television 22 or a second connector linked to a video recorder 21. The multiplexing circuit 20 is managed by the microprocessor 23.

The service information module 19 is in charge of managing electronic program guide data. It consists in a program run by microprocessor 23, but is represented as a separate application in FIG. 1. The service information module enables the user to program a plurality of preferred service lists, such as a list for each family member.

The operating system of the decoder requests the microprocessor 23 to systematically extract from the received data stream information relating to the structure and content of the stream. This information is used to build a list of broadcast services, which is stored in memory 12 and, according to the present embodiment, continuously maintained up to date.

Memory 12 contains a program module for generating a coherence check between the list of broadcast services and one or more preferred lists of services maintained by the service information module (or any other type of customized list maintained by an application). The module possesses an API (Application Programmable Interface) allowing an application to call this module for triggering a coherence check. The list of services to be checked is passed as a parameters through the corresponding function call.

Some advantages of such a solution are to propose:
- an automatic way to perform this operation (without any checking action required from the user, since the triggering can be carried out by an application),
- a time effective way to perform this operation, as it can be done for a given service list (not all of them) at a time controlled by the application; an application can thus determine when processing power should be allocated to this task.

Figure 2:
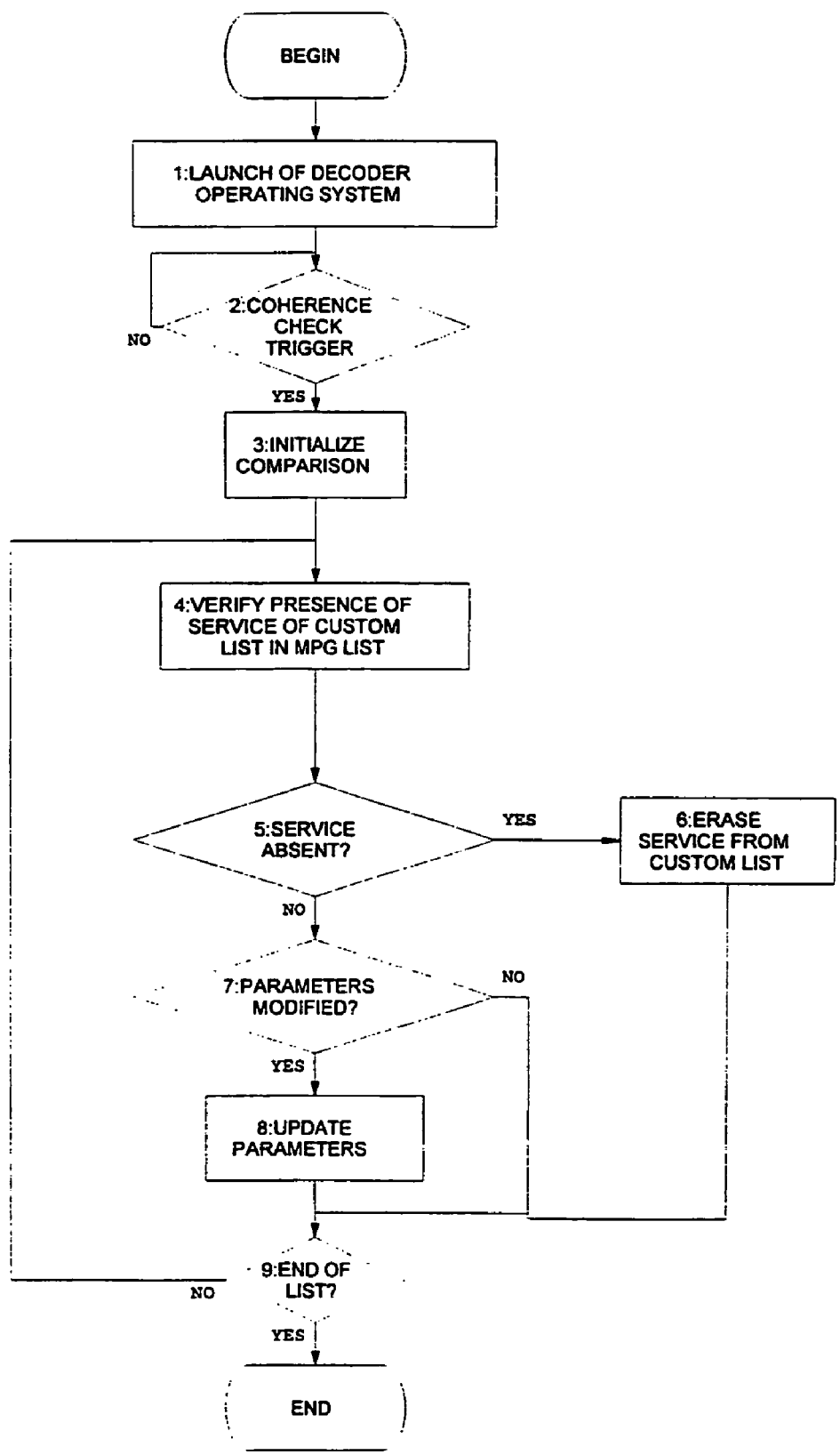
FIG. 2 is a flowchart of the program module that manages the consistency of service lists.

The running of the module is illustrated by the flowchart shown in the FIG. 2. The check is a complete one, based upon the principle of verifying in the broadcast service list the content of each service contained in the given customized service list to be checked.

When the decoder is switched on, the operating system in memory 12 is booted (step 1). The operating system launches the service information module which instructs the microprocessor to continuously retrieve data packets relating to the Master Program Guide. The demultiplexer is configured accordingly by the microprocessor.

During a previous session, the user created a customized list of services through an electronic program guide (EPG), which is part of the service information module. For example, the user selected among all services present in the Master Program Guide those services which correspond to his personal tastes. This customized list comprises for each service a service identifier, a service type (e.g. television service, radio service or interactive service), status information, title . . . . This data is a subset of the data available in the Master Program Guide.

At step 2, at a time chosen by the EPG, the EPG calls the coherence check function of the module in memory 12. As a parameter, it passes the customized list to be checked. The moment chosen by the EPG to call this function is for example upon acquisition of the MPG after booting, or after a certain period of inactivity of the user, determined by measuring the last time he manipulated the remote control, or periodically—for example at night—, or when the EPG detects an error in a customized list. An error occurs for example when the decoder tries to access a service which is not available any longer. In this case, the user sees a black screen.

At step 3, the module initializes a pointer to point the beginning of the customized list to be checked. For each service in that list, the module verifies the presence of this service in the list extracted from the MPG (step 4). If the service is absent (step 5), then it is erased from the customized list (step 6). Else, the module checks whether the parameters for the service found in both lists are the same (step 7). If parameters differ, then the parameters of the customized list are updated (step 8).

In step 9, the module loops back to step 4 if all services of the customized list have not yet been checked. Else, the checking process is terminated (step 10).

According to a variant embodiment of the invention, for reestablishing coherence, the module checks whether the customized list should contain additional services, in particular services added to the MPG since the last coherence check of the customized list. This feature is applied for instance when the customized list is the result of a filtering process of the MPG list, and when the initial filter criteria are available to the module. For example, the service theme or title or audio language may be a filter criterion. In this case, triggering the coherence check results in carrying out the filtering process anew, starting from the MPG list of services.

When this is done, the data corresponding to the customized service list that is stored in non-volatile memory are updated accordingly and the application that uses these data is notified of the end of the operation.

Sometimes, the received list does not contain a service that is still broadcast. In this case, it is preferable to wait a little time to update definitely the customized list even when the disappearance of the service is detected during a coherence check, in order to maintain across to this service. A solution to solve this problem consists of associating a counter with each service of the customized service list. These counters are initialized with a predetermined value, for example "3", when the service is recognized in the received list. If the module detects a service disappear once, the counter of this service decreases. When it reaches the value "0", all the parameters of this service are erased in the customized service list.

A variant consists of not using a prestored received list for the coherence check. If the memory space is too small, it is no possible to continuously manage and update a received list. When the module decides to update a customized list (step 2), the module requests the extraction of new tables from the digital multiplex. When these tables are received, the customized list can be updated.

Examples of application of this feature by a dedicated IRD are given below to illustrate the possibilities offered by such a mechanism. In fact, they correspond to two different broadcaster policies implemented through downloaded applications:

In the first IRD example, the preference service list edition is provided to a dedicated downloaded application called "electronic program guide" that also provides navigation and program information retrieval features. The resulting lists are also used by another application called "surfing banner" that provides service connection and current broadcast information retrieval features. In such an IRD, the preference lists are checked against the broadcast one on two occasions:

the first check is performed automatically when entering the given preference list edition screen in the EPG application, as this preference list editing feature is not invoked that often by the user, the surfing banner application also triggers the operation when a connection error is notified to it following a service connection trial. Triggering is thus done an a as needed basis.

In the second IRD example, the preference service list edition is provided via the user interface embedded in the IRD. The preference lists are then checked against the broadcast one at a given time, for example at night. When this time occurs, the module is called Both examples show that the invention allows to perform automatically the consistency check operation, at times when its either not disturbing (night-time) or when it is necessary (before editing the list, or when a connection error is detected). An additional advantage of offering the trigger through an API is that the policy can evolve depending on service and application requirements.

The benefits of the invention are to be able to provide an IRD with a feature that allows to check the consistency of all the customized service lists stored in non-volatile memory with the content of the broadcast one in an automatic but efficient way. On one side, its then an automated process, thus avoiding situations in which the user can select unavailable services or those in which she has to rebuild its customised service lists at each change in the broadcast. On the other side, the proposed process is time controlled. A fully automated one is very CPU intensive and disturbs a normal usage of the device. As the invention proposes to make the feature available through an API, it can be triggered at appropriate times depending on application features in order to minimize its impact on the user.

Although the embodiment concerns service lists, the invention can be adapted to other types of lists, such as for example event lists.

The invention claimed is:

1. Method for managing broadcast service lists in a television receiver, the method comprising the steps of:
    receiving an update of a list of at least one service available to said receiver;
    storing at least one customized list of services;
    triggering a consistency check between said at least one customized list of services and the update of the list of said at least one service available to the receiver, wherein said triggering step is chosen by an application in said receiver as not to disrupt receiver use by said check, said consistency check comprising:
        verifying the presence of a service contained in the stored customized list with the received updated list; and
    triggering said consistency check when the application detects that the service selected by a user in one of said stored customized lists is not available.

2. Method according to claim 1 wherein when the service contained within the stored customized lists is not in the updated list, deleting said service from the stored customized list.

3. Method according to claim 2, wherein the deletion of a service from the stored customized list is carried out after a predetermined number of checks reveal the absence of the service in the update list.

4. The method according to claim 3, wherein said predetermined number is more than one.

5. Method according to claim 1, wherein when it is verified that the service contained in the stored customized lists is in the received updated list, comparing whether parameters relative to said present service and parameters stored in said stored customized list corresponding to said present service are similar to parameters relative to said present service in the updated list, and in case of a difference between the parameters, updating the parameters of the present service in the stored customized list.

6. Method according to claim 1, wherein a consistency check of a stored list is triggered:
    (a) when an application for editing the at least one stored list is launched and/or
    (b) at a predetermined time of the day.

7. A Receiver for a digital television system, the receiver comprising:
    a central unit,
    reception means for receiving and storing broadcast services and at least one services list of at least one service available to said receiver,
    a memory containing a program,
    a memory for storing at least one customized list of at least one service,
    means for checking the consistency between said at least one customized list of services and said list of at least one available service, said consistency check verifying the presence of said at least one service contained in the stored customized list with the at least one services list;
    a memory storing an application adapted to trigger the consistency check by said checking means, wherein the checking of the consistency is triggered by said application at a time chosen so as not to disrupt receiver use by said checking, said consistency check also being triggered when the application detects that the service selected by a user in one of said stored customized lists is not available.

8. Receiver in a digital television system according to claim 7, further comprising:

means to allow the user to select a service of the customized list and means for updating the customized list which is triggered if the selected service is not in the updated list.

9. Receiver in a digital television system according to claim 8, further comprising:

a counter which counts the number of times when a service in the customized list is not in the update list, and an erasing means which deletes said service from said customized list which is activated when the counter reaches a predetermined value.

10. The receiver of claim 9, wherein said counter counts at least two times before said erasing means deletes the service from the customized list.

* * * * *